United States Patent [19]

Caudill

[11] 3,855,937
[45] Dec. 24, 1974

[54] ELECTRIFIED TROLLEY TRACK
[76] Inventor: Kent H. Caudill, E. 3618 Tenth Ave., Spokane, Wash. 99202
[22] Filed: Mar. 14, 1974
[21] Appl. No.: 451,038

[52] U.S. Cl.................. 104/94, 105/155, 191/23
[51] Int. Cl............................................ B61b 3/02
[58] Field of Search............ 104/89, 91, 93, 94, 95, 104/106, 107, 108, 118, 130, 139, 140; 191/22, 23, 29, 45, 48, 49; 105/148–150, 105/154, 155, 157, 180

[56] References Cited
UNITED STATES PATENTS
2,954,743  10/1960  Henderson........................... 104/93
3,027,127  3/1962  Suozzo................................ 105/155
3,308,575  3/1967  Lemelson............................. 104/89
3,337,697  8/1967  Martin et al. ..................... 191/23 R
3,392,244  7/1968  Hillmann............................. 104/94
3,800,707  4/1974  Hermann............................. 104/94

Primary Examiner—M. Henson Wood, Jr.
Assistant Examiner—Richard A. Bertsch
Attorney, Agent, or Firm—Keith S. Bergman

[57] ABSTRACT
A track, especially for support of the trucks of a tram having plural extruded conductive elements aligned to provide both carrier support and electrical transmission. The track is configured to interiorly support conical wheels of a tram with both lateral and vertical restraint. Electrical busses are carried by the track elements with insulation isolating each track member from others as well as from external contact.

3 Claims, 3 Drawing Figures

ELECTRIFIED TROLLEY TRACK

BACKGROUND OF INVENTION

A. Field of Invention

My invention relates generally to tram track construction and more particularly to such tracks providing positive constraints and electrical bus lines.

B. Description of Prior Art

Tram of many shapes and functions are well known. These devices can be conveniently categorized for analysis upon the basis of two criterion; one, whether the trolley drive wheels are carried exteriorly or interiorly of the track structure; and, two, whether the track structure carries electrical current transmission means with which to power the carrier. The differences between members of different categories is fairly essential and quite obvious.

My invention falls within the group of tram tracks wherein the drive wheels are positioned interiorly of the track structure and this structure does carry electrical current. My track is distinguishable from known art within this class in several essential respects. Firstly, my track carries current integrally within the track element itself without any ancillary conductors. Secondarily, my track encloses the drivewheels both vertically and laterally to provide ultimate stabilization of the tram and yet permit inverted operation as well as normal suspended operation at both horizontal and substantially inclined attitudes greater than known in prior art.

Known self-driven trams that have restraints generally provide cylindrical wheels within a rectangular track or hemispheric wheels rollably carried within a cylindrical track. My invention provides conical drive wheels positioned within an appropriately configured supporting cavity to provide improved traction and longitudinal and lateral sway stabilization not possible with the other wheel arrangements without use of separate stabilizer attachments. Furthermore my wheel and track conbination allows either vertical or inverted tram support and operation at greater inclines. The conical wheels of trucks used with my invention tend by their configuration to center the tram laterally relative to the track and automatically compensate for wear of either wheel or track without adjustment.

Present monorails normally provide electrical power transmission through either a separately suspended bus or through a separate conductive element of some sort joined to the track structure. My invention passes electrical current directly through the structural track element per se. This feature results in lower material costs by eliminating the redundancy of separate systems, prevents conductor breakage and allows reduction of sparking caused by separation of conductor and brush elements. The whole track structure allows use of three-phase current and may be insulated.

In effect my invention provides a drive system heretofore unknown in tram track art which provides the best features of both constrained and conductive systems without the drawbacks of either.

SUMMARY OF INVENTION

My invention provides a plurality of opposed track elements releasably joined to an elongate center beam with insulators therebetween to form a three element electrical conductive system. The track elements are internally configured to rollably support paired opposed conical drivewheels carried on a common axle journaled on the trucks of a supported tram.

Mirror image track elements configured for extrusion provide semi-elliptic outer surface and a channeled inner-surface configured to rollably support the opposed conical wheels. Opposed track elements are joined in lineally staggered fashion to an I-shaped hanger or beam element to form a unitary structure with a small medial gap at the bottom, and the elements are joined in lineal adjacency to form a track. The various elements are joined by bolt-nut combinations positioned at intervals along the length of track. Insulative elements are positioned to electrically isolate each side of the track and the medial hanger Conductive wheels contact the track elements and a sliding boss contacts the hanger element to pass current from their respective conductive elements to a support trolley.

Opposed conical drivewheels carried on a common axle journaled on a supportable tram communicate with the internal surfaces of the track element in a manner to provide supportative contact and a drive surface irrespective of carrier orientation. A tram support element depends downward from support on the wheel axle through the gap at the bottom of the track elements to support a depending tram.

In providing such a device it is:

A principal object of my invention to create a tram track forming three electrical conductive isolated power circuits from which a supported tram may receive electric energy.

A further object of my invention to provide such a tram track wherein conical drivewheels of a supported tram are maintained on the track inner surface with lateral and vertical restraint irrespective of carrier orientation or attitude.

A still further object of my invention to provide such a track that is of new and novel design, of rugged and durable nature, of simple and economic manufacture and otherwise well suited to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being set forth in the accompanying drawings as required.

BRIEF DESCRIPTION OF DRAWINGS

In the accompanying drawings which form a part hereof and wherein like numbers of reference refer to similar parts throughout.

DESCRIPTION OF THE PREFERRED EMBODIMENT

Figure 1:
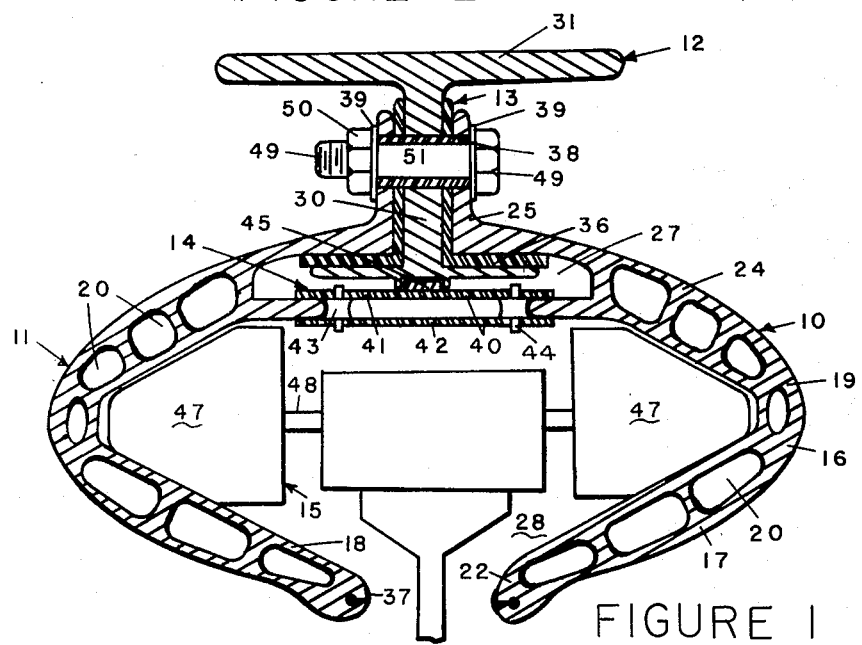
FIG. 1 is an orthographic cross-sectional side view of my invention showing its elements, their configuration and relationship with typical tram trucks and conductors supported thereon.

Referring now to the drawings in more detail and particularly to that of FIG. 1, it will there be seen that my invention generally comprises right track member 10 and left track member 11 joined by track hanger 12, with insulation 13 electrically isolating each member; a tram is supported on the track by wheel structure 15 and receives electrical energy through trolley 14.

Figure 2:
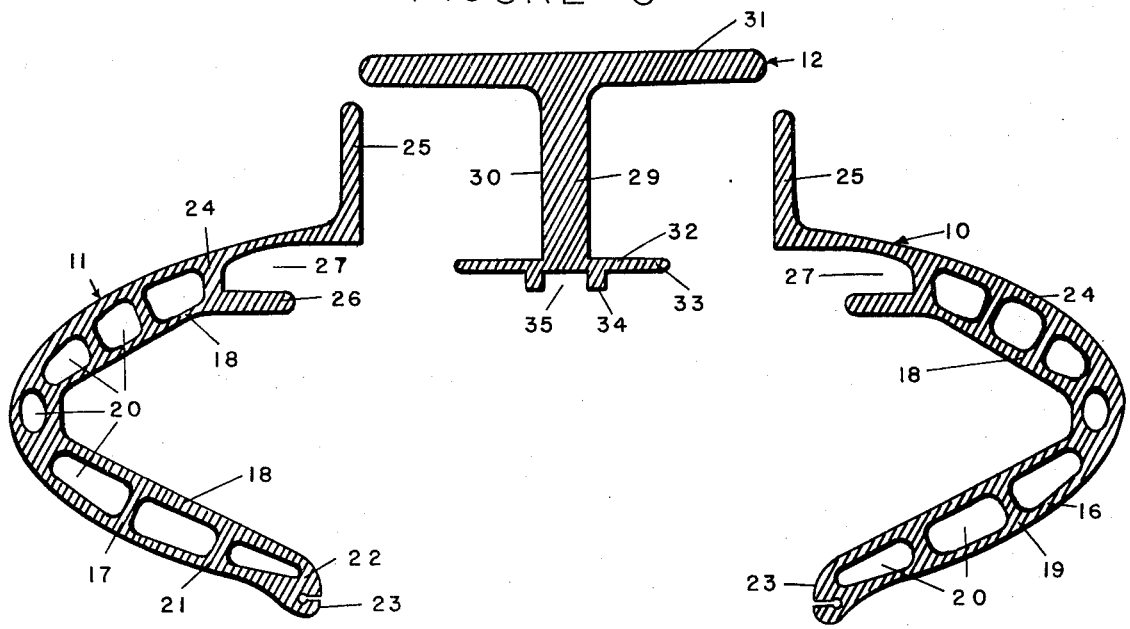
FIG. 2 is an exploded sectional view similar to FIG. 1 showing the three principal structural elements of my invention.

Referring particularly to FIG. 2, it is seen that right track member 10 comprises an elongate metallic extrusion with cross section providing generally U-shaped support element 16 having semi-elliptical outer surface 17 and a truncated triangular inner surface 18 separated by supportative web 19 defining multiple voids 20 to reduce weight. The lower inner portion of the support element terminates in bulbous enlargement 22 providing arcuate end portion 23. The upper inner part of the support element web extends somewhat further inwardly than the lower portion to provide thin substantially perpendicular flange 25. Inner surface 18 of the upper portion 24 of the support element angles inwardly to form a relatively thin ledge 26 to receive electrical trolley member 14. Immediately above ledge 26, void 27 provides an opening for communication with the lower ledge of track hanger 12.

The size of the track element may vary with a particular application. It may range from a web having a width of a few inches for use in light installations to a web 2 to 3 feet in width for use in large multi-passenger applications. In the illustrated instance the flange is extruded from an aluminum alloy because of its good extrudability characteristics and light weight in relation to strength and electric conductance, however, other metallic or synthetic material having similar characteristics and appropriate strength could be substituted therefore.

Left track member 11 is a similar extrustion to that provided in the right track member, however, it is the mirror image of its opposed member. The two track elements are aligned relative each other as shown particularly in FIG. 1 so that inner surfaces face one another to provide substantially enclosed cavity 28 having a medial bottom opening between opposed surfaces 23.

Track hanger 12 provides a beam 29 of modified I-shaped cross-section having vertical center element 30 of a vertical dimension to communicate with flange 25 of track members 10 and 11, larger horizontal upper flange 31 each leg of which is approximately the same length and width as center element 30 and somewhat smaller horizontal lower flange 32. On bottom surface 33 of lower flange 32, spaced parallel rails 34 extend downwardly a short distance to provide longitudinal slot 35 to receive an electrical collector of a trolley. This beam is similarly designed for formation by extrusion from materials similar to those of the support elements. Its dimensioning must be such that in cooperation with the support elements it provides appropriate strength and rigidity to support itself and carried trams. Insulation elements 13 electrically isolate the opposed support elements and hanger beam from each other so that each may provide a separate circuit. As seen in FIG. 1 opposed elements 36 form L-shaped cross-section of non-conductive material, insulates between track members 10, 11 and hanger beam 12. Elongate element 37 of somewhat modified T-shaped cross-section and similar material is placed over the arcuate end portion 23 of bulbous enlargment 22 of track member to prevent electrical contact between this track element and the carrier support. Tubular insulating sleeves 38 and washers 39 isolate fasteners 49 from the metallic elements they join. If desired the outer surface of all the structure elements may be covered with a non-conductive coating to prevent accidental grounding or shorting to external sources.

Electrical trolley 14 provides communication between current transmission members 10, 11 and 12 and a carried tram. The trolley elements are carried by spaced parallel relatively thin body elements 40 providing rigid non-conductive plates positioned so that upper element 41 is immediately above opposed ledges 26 of track members 10, 11 and lower body element 42 is immediately below this ledge with the outer portion of both body elements extending horizontally outwardly past ledge 26 to allow support thereon. The body elements are maintained in parallel adjacency by plural opposed rollers 43 rotatably carried on shafts 44 extending between the body element near their lateral portions so that the rollers contact the inner edge of opposed ledge 26 to form brushes. Brush elements 45, of appropriate conductive material, such as carbon, dimensioned to fit within slot 35 between depending rails 34 on the bottom of hanger flange 32, is biased upward against track hanger 12 to form an electric path from this element. All brush elements are provided appropriate circuitry (not shown) to transmit power from the track circuits to the powering structure of a carried tram. Obviously, one, two or all of the conductors may be used as desired.

Tram drivewheels 15 comprise at least two opposed conical rollers 47 having a configuration corresponding to the inner surface 18 of track members 10, 11. The drivewheels are carried by a common axle 48 at a lateral position as illustrated so as to operationaly contact the opposed inner surfaces of the track support arms. One or several such wheel-axle combinations may be provided on single or multiple trucks to support a tram upon my rail in a manner well known in the prior art. At least one axle per tram must be driven, of course, to propel the tram along the track. The particular driving methods and mechanisims are not an essential part of this invention and are therefore not illustrated; the known art is quite operative with my invention. The rollers are preferably fabricated from hard rubber but obviously other material having similar characteristics could be used.

Figure 3:
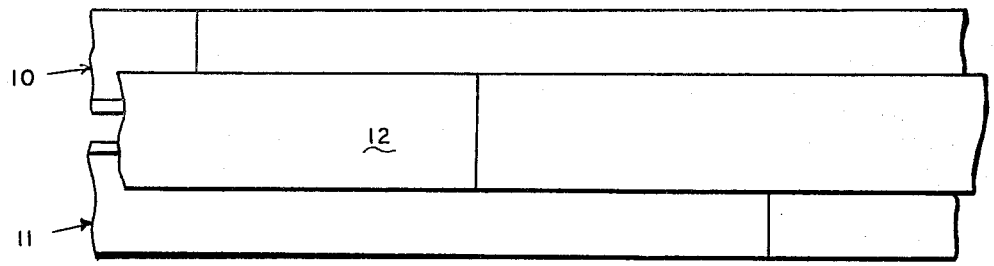
FIG. 3 is an orthographic plan view, looking downwardly of a group of joined track and hanger elements.

Having thusly described my invention, its operation may now be understood:

Firstly, the extruded elements are formed in appropriate lengths by methods commonly known in the metal forming art. The ends are planed or otherwise provided with known joinder means that will provide an electric conductive path along a course of lineally adjacent elements. The right track members 10, left members 11 and hanger member 12 are placed in juxtaposition with insulation elements 36 in place therebetween. The elements are lineally staggered as shown in FIG. 3 so that the inner-section of any extruded element will not be positioned adjacent the inner-section in any other elements. Holes 51 are established in longitudinally spaced array through flange 25 of track members 10, 11, center element 30 of hanger beam 12 and the vertical legs of opposed insulation elements 36. These holes 51 are of a dimension to carry tubular insulating sleeves 38. Bolts 49, sized to communicate with the channel defined in insulator 38 are placed therethrough with insulating washers 39 on each side and nut 50 threadedly engaged thereon to secure the releasable joinder of the track elements. The size and spacing of the bolt-nut fasteners will necessarily depend on the physical characteristics of the entire structure.

Upper flange 31 of track hanger beam 12 is structurally joined by known means (not shown) to support structures to provide continuous track between desired terminals. While the track members shown are straight, curved sections with either lateral or vertical altitude can be provided to complete a desired track circuit, by fabricating the various extruded elements in curvilinear fashion of appropriate length and radius.

A train is supported by drivewheel members 15 and provided electric current by trolley 14. The drivewheels rest upon the opposed inner walls of the track support element inner surface 18.

It is to be noted that because of the particular shape of the wheels and supporting track cavity some portion of a wheel is in contact with the track to provide traction at all times. Similarly the wheels are at all times mechanically constrained to limit in both vertical and lateral motion.

By including the power transmission circuits within the track structure itself, my invention not only cuts down on material and installation costs of a separate electrical distribution system but also because of its potential current carrying capabilities can serve as the transmission device for power utilized for other than the monorail carrier, and can in fact be used exclusively for external power transmission.

Having thusly described my invention, what I desire to protect by Letters Patent, and what I claim is:

1. A current carrying tram track unit for wheel supported trams comprising, in combination:
   similar elongate opposed support elements having upper central flanges for joinder to a medial hanger beam and laterally extending portions defining an internal channel having a cross-section with lateral most parts defined as opposed outwardly pointing truncated triangles to accept and rollably support opposed truncated conical wheels of a tram truck;
   a central hanger beam having a medial portion positioned between the upper medial flanges of the opposed support elements;
   fastening means releasably joining the opposed support elements and central hanger beam; and
   insulating means electrically isolating the support elements and central hanger beam from each other.

2. The invention of claim 1 further characterized by:
   the opposed support elements and central hanger beam formed of electrically conductive material; and
   each aforesaid element having an elongate linear contact portion to allow passage of current to a trolley passing through the central channel interiorly defined by the opposed support elements.

3. The invention of claim 1 further characterized by:
   a plurality of tram track units joined in linear electrically conductive adjacency;
   each tram track unit being formed with support elements and central hanger beam terminating in different spaced planes, so that no joints between different elements are co-planar, so as to form a unitary track structure.

* * * * *